US005667096A

United States Patent [19]

Wu

[11] Patent Number: 5,667,096

[45] Date of Patent: Sep. 16, 1997

[54] DRUG STORING APPARATUS FOR AUTOMATIC DRUG DISPENSING MACHINES

[76] Inventor: King-Sheng Wu, No. 712, Tu Cheng Rd., Ta Li City, Tai Chung Shignn, Taiwan

[21] Appl. No.: 598,723

[22] Filed: Feb. 8, 1996

[51] Int. Cl.$^6$ .......... B65G 59/00

[52] U.S. Cl. .......... 221/6; 221/130; 221/131; 221/132; 221/133; 221/197; 221/155; 221/203; 221/258; 221/265

[58] Field of Search .......... 221/17, 6, 7, 130, 221/131, 132, 133, 196, 197, 203, 258, 265, 285, 287, 155

[56] References Cited

U.S. PATENT DOCUMENTS

| | | | |
|---|---|---|---|
| 4,782,979 | 11/1988 | Smith et al. | 221/6 |
| 4,869,395 | 9/1989 | Rubbmark | 221/131 |
| 4,903,861 | 2/1990 | Yuyama | 221/265 |
| 5,014,877 | 5/1991 | Roos | 221/265 |

FOREIGN PATENT DOCUMENTS

| | | | |
|---|---|---|---|
| 406024401 | 2/1994 | Japan | 221/133 |

*Primary Examiner*—H. Grant Skaggs

[57] ABSTRACT

A drug storing apparatus for an automatic drug dispensing machine includes a frame provided with a multiplicity of inclined supports arranged one on top of the other or in rows for supporting a multiplicity of drug cases, and the supports may also be configured into rails. The drug cases are detachably connected to a multiplicity of drive boxes which may be mounted onto the frame along the inclined rails. The drug cases are arranged in such a manner that their outlets are oriented towards a central portion of a hopper. Each drive box is also provided with guide rails and contains therein a motor which has an axle oriented towards its corresponding drug case. When a drug case slides along the guide rails to fit onto its corresponding drive box, a coupling of a feeding element of the drug case just fits onto the axle of the motor. A computer control center controls the rotation of the motor axles of the drug cases so that the feeding elements thereof may feed predetermined kinds and number of drugs into the central portion of the hopper.

8 Claims, 9 Drawing Sheets

DRUG STORING APPARATUS FOR AUTOMATIC DRUG DISPENSING MACHINES

BACKGROUND OF THE INVENTION

1. Field of the Invention

The present invention relates generally to a drug storing apparatus, and more particularly to a drug storing apparatus for use in an automatic drug dispensing machine. The apparatus consists of a multiplicity of drug cases arranged in rows one on top of the other with their outlets oriented towards a central portion of the drug dispensing machine. The drug cases as well as their drive elements may be disengaged from a frame to facilitate assembly, repairs, or refilling of medications.

2. Description of the Prior Art

The present invention is particularly adapted for use in hospitals and large-sized drug stores. The invention may be employed in conjunction with computerized systems for dispensing a predetermined number of drugs from drug cases into a packing machine. Preferably, each pack of drugs is printed with the name of the patient to which the drugs are to be administered, a particular time and date for administration, and the like; besides, each pack preferably contains a dosage of drugs for one administration.

There are a number of patents relating to drug or small item dispensing machines or apparatuses, namely, U.S. Pat. Nos. 4,697,721; 5,044,516; 5,101,612; 5,146,730; 5,152,422; 5,176,285; 5,191,741; 5,329,749 and 5,363,887. These patents are, however, directed to continuous dispensing of only a single kind of drugs. Among these, U.S. Pat. No. 5,152,422 teaches a plurality of pill containers held in a magazine disposed inside a cylindrical housing removably mounted on a base. U.S. Pat. No. 5,176,285 describes an automatic pill dispensing apparatus comprising a plurality of cartridges mounted on a common rotatable shaft within a housing. U.S. Pat. No. 4,697,721 discloses a pill storage and dispensing cassette. U.S. Pat. No. 5,044,516 also teaches an automated pill dispensing device comprising a stationary annular plate in which a boss formed on a movable plate is received.

Additionally, U.S. Pat. No. 4,893,057 depicts a packing machine for packing small items like a tablet, capsule or pill. This patent discloses a feed slider and a distributing slider positioned over each other, both of which reciprocate in a horizontal direction perpendicular to each other, in which small items are allowed to drop from openings in the feed slider through holes in the distributing slider into cups. Said patent is also directed to the dispensing of single items.

U.S. Pat. No. 4,171,065 discloses a circuitry and system for controlling multi-use article dispensing cells, while U.S. Pat. Nos. 4,396,828 and 4,597,091 respectively provide a different form of pill counter.

In U.S. Pat. No. 4,655,026 to Wigoda, a pill dispensing machine for use in hospital or big drug stores is disclosed. Wigoda teaches a container strip 12 with preformed recesses. Pills are dispensed into the recesses by means of a plurality of dispensing devices. A pill container unit consists substantially of four recesses and is covered by a backing 22 printed with the name of the patient and the particular time and date for administration. Each pill container unit contains at most four doses (four packs) for one day's administration. This patent, however, does not provide any improvement on the dispensing units.

Inamura et al. in U.S. Pat. No. 5,097,652 provide a comparatively complete drug packing apparatus, which includes improvements on the dispensing units. Said packing apparatus comprises a multiplicity of upwardly extending elongated tablet cases in a planar arrangement to one another, which are disposed in an upper section of a casing for storing various kinds of drugs. The tablets are collectively transferred by a transfer mechanism into a packing machine. It is, however, difficult to refill the tablet cases in the central portion. It is also not easy to identify a particular tablet case from the many tablet cases on the planar surface. Besides, the horizontal distance from the bottom of each tablet case to the transfer mechanism is great, prolonging the time for transferring the tablets to the packing machine.

U.S. Pat. Nos. 4,621,480 and 5,329,750 respectively provide a packing machine, while U.S. Pat. No. 4,930,289 teaches filling of medications into tubular structures, and U.S. Pat. No. 4,473,196 describes pill storing boxes containing medications for monthly administration.

In 1980, the inventor of the present invention invented an automatic pharmacy system for Taiwan's Taichung Veterans' General Hospital. The system has worked excellently. The pharmacy system includes a box-type drug storing apparatus (as shown in FIG. 9) in which, according to input commands, drugs may be automatically dispensed into a hopper to be ready for packing, so that the drug dispensing and packing operations become automated.

Upon further study and research, the inventor has found the following drawbacks in the above-mentioned pharmacy system:

(1) The size of the drug storing apparatus is too large. It will require a length of about 3 m. in order to handle the workload of a large hospital's pharmacy.

(2) The greatest drawback is that, as shown in FIG. 9, when a tablet discharged from a drug case 1 rolls to the center of a hopper to be ready for packing, the horizontal distance A from the case 1 to the center of the hopper is very far. Since the packing machine of the system will not proceed with a packing operation unless all the predetermined number and kinds of drugs are collected, the time it takes for a drug to roll along the hopper will directly affect the cycle of the packing process. In other words, if the horizontal distance A is reduced, the packing operation will be quicker and hence more efficient.

(3) The drug storing cases 1 are substantially drawer-like structures, each of which is provided with rails. After they are pulled out, they have to be pushed back into place with the hands. Additionally, the inside of each drawer must be provided with a drug feeding element for pushing the drugs near an outlet, hence the structural elements of the prior invention are complicated and assembly thereof is not easy. It is also costly to manufacture.

(4) The amounts of drugs stored inside the drawers must be checked regularly by pulling out each of them. When checking the amounts of the stored drugs or refilling them, the entire drug storing system has to be paused, interrupting the dispensing operation.

SUMMARY OF THE INVENTION

A primary object of the present invention is to provide a drug storing apparatus in which the apparatus does not need to stop operation when checking drugs stored in the drug cases or refilling, eliminating the drawbacks in the prior art.

Another object of the present invention is to provide a drug storing apparatus which is simple in construction and small in size, so as to reduce the travel from a drug outlet to the center of a hopper to shorten the packing operation cycle and to enhance efficiency.

A further object of the present invention is to provide a drug storing apparatus for an automatic drug dispensing machine, the apparatus having components which may be massed produced and assembled speedily. Still another object of the present invention is to provide a drug storing apparatus for an automatic drug dispensing machine, in which individual drug cases may be separated from their corresponding drive elements so that when a certain element inside the drug case is damaged, it may be removed separately from the drug case.

A still further object of the present invention is to provide a drug storing apparatus for an automatic drug dispensing machine consisting of a multiplicity of drug cases with feeding elements, the feeding elements being arranged into a single unit which may be detached as a whole from a frame of the drug dispensing machine for necessary repairs.

According to a first aspect of the present invention, the drug storing apparatus of the automatic drug dispensing machine has a multiplicity of drug cases arranged in overlapping rows and mounted on a frame, and a hopper disposed in the center of the frame. Each drug case has an outlet disposed at an inner end thereof and oriented towards the hopper. Each drug case also has an outer end, which is comparatively higher in position than the inner end, and the outer end has a bottom rim connecting a bottom edge of the inner end to form an inclined plate. The inside of each drug case is provided with an automatic feeding element, whereby the drugs stored in each drug case may, according to input commands, automatically drop into the hopper by means of the slope of the inclined plate and their own weights.

According to a second aspect of the present invention, the drug storing apparatus comprises drug cases, drive elements and feeding elements which may be standardized, and mass-produced and assembled in a speedy manner.

According to a third aspect of the present invention, the drug storing apparatus comprises rails disposed between drug cases and drive elements to facilitate their assembly.

According to a fourth aspect of the present invention, the drug storing apparatus comprises a frame provided with a multiplicity of rails and drive units so that the drive units may be slidably mounted onto the frame in a quick manner. Additionally, the rails are oriented towards a central inclined portion of the frame and are arranged in tiers so that drug outlets are also oriented towards the central portion of the frame.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
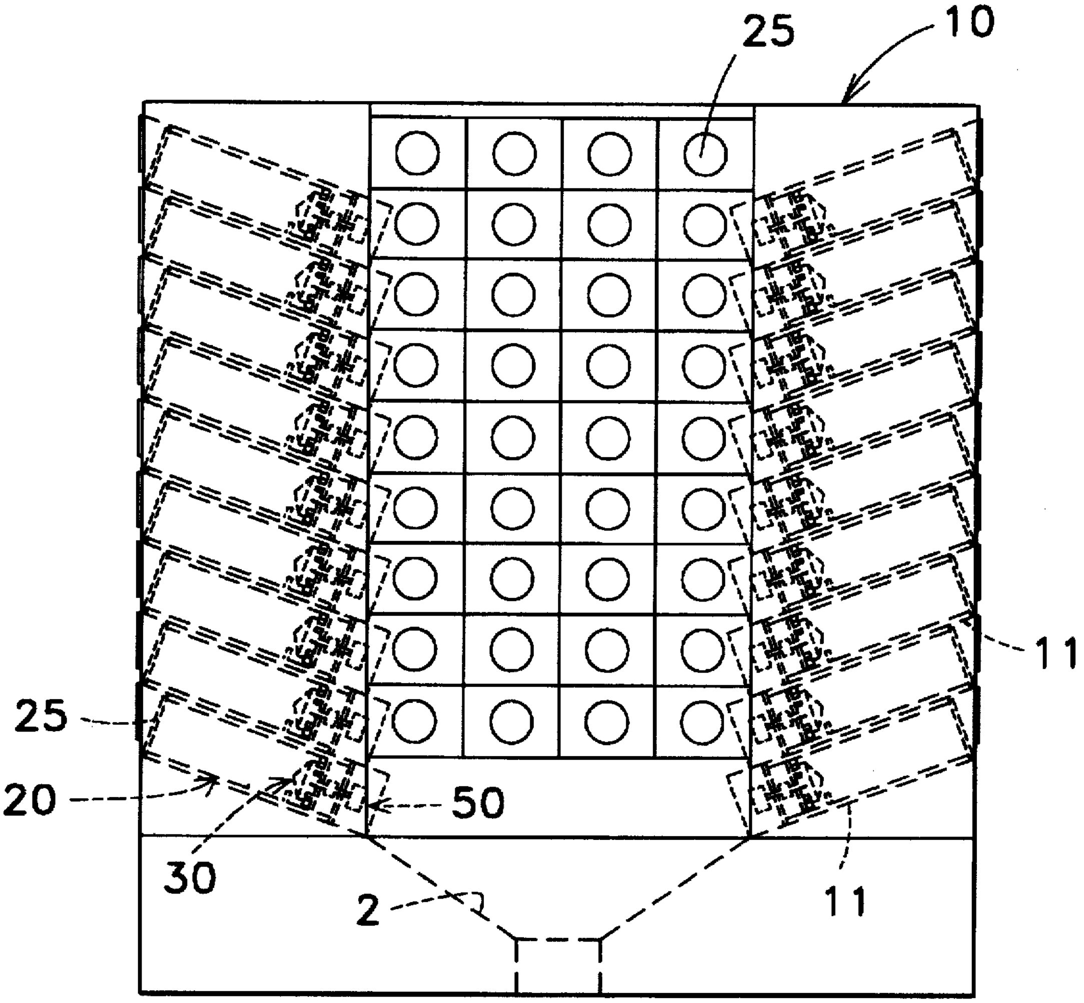
FIG. 1 is a plan view of a first preferred embodiment of the drug storing apparatus according to the present invention.
Figure 2:
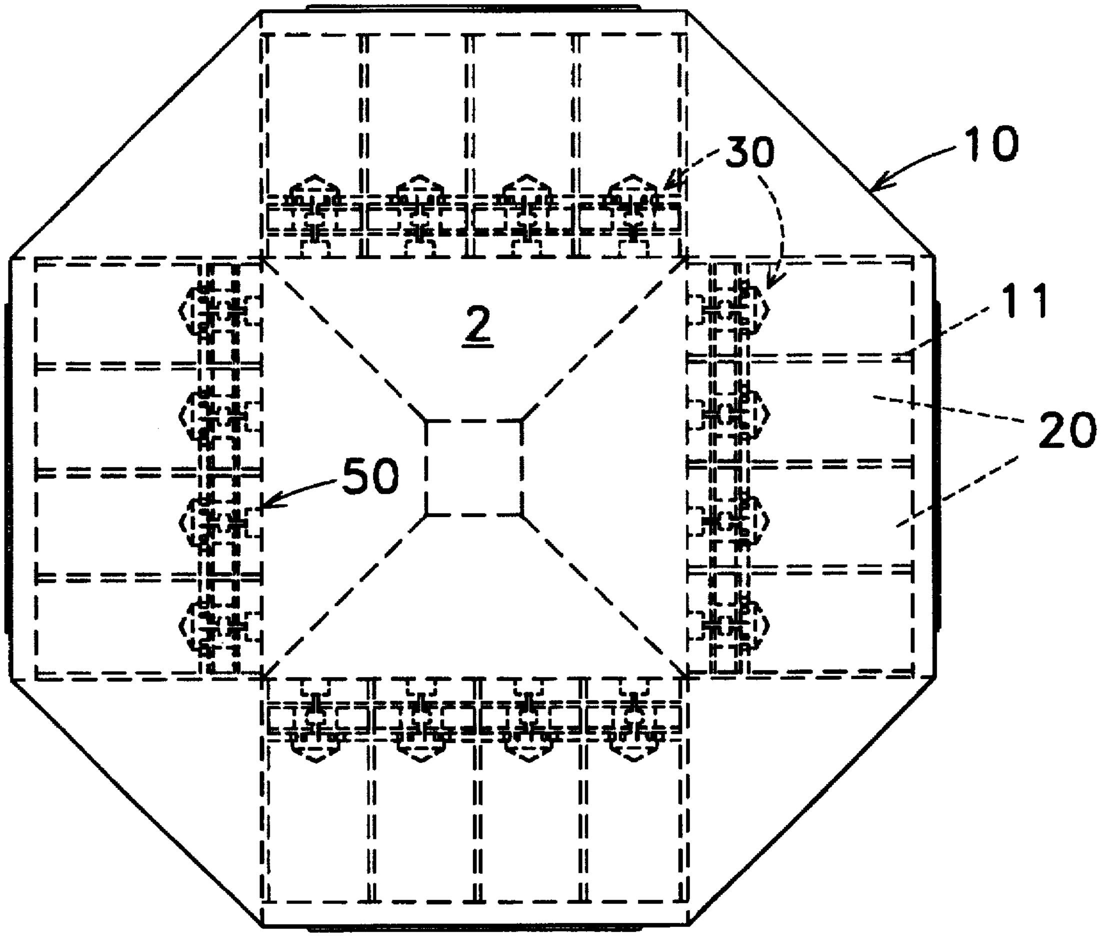
FIG. 2 is a top view of FIG. 1.

With reference to FIGS. 1, 2 3 and 7, a preferred embodiment of the drug storing apparatus according to the present invention comprises a frame 10 having a hopper 2 (shown in FIGS. 1 and 2) disposed in a central portion thereof, the frame 10 having a multiplicity of inclined rails 11 at its four sides, which are oriented towards a same direction, for example, the central portion of the frame 10. Therefore, the frame 10 may be a cubic, cylindrical or polygonal structure. The apparatus further comprises a multiplicity of drive elements 50, each of which has a drive box 52 (see FIGS. 3 and 7) capable of being slidably fitted onto the frame 10 along the inclined rails 11. Each drive box 52 contains at least a motor 51, and is connected to a drug case 20 containing a feeding element 30, so that the drug case 20, in the form of a drawer, may be detachably fitted onto the inclined rails 11 of the frame 10 together with the drive box 52.

Figure 3:
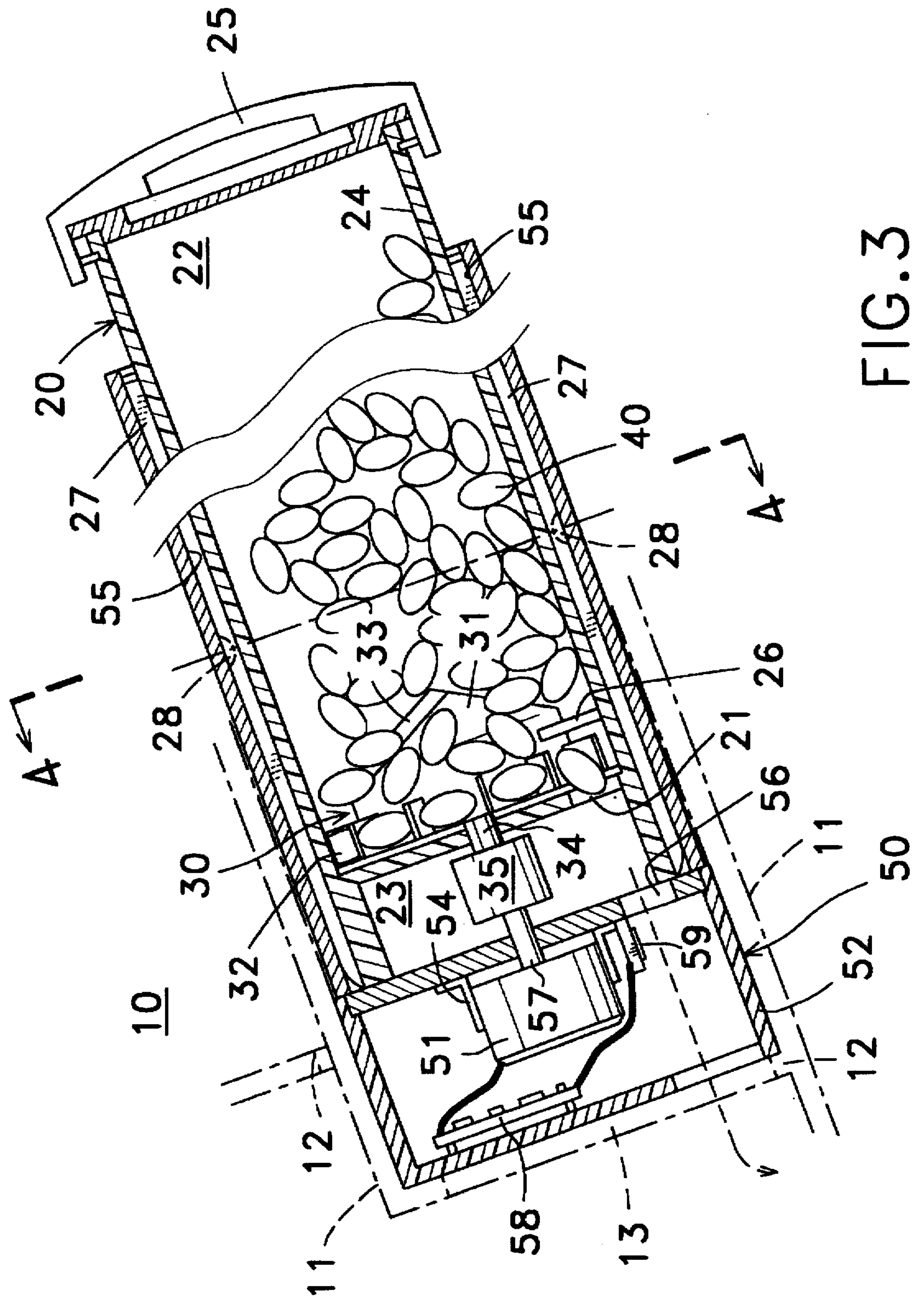
FIG. 3 is a sectional view of the preferred embodiment of the present invention.

The drive box 52 may be connected to the drug case 20 as an integral whole, as shown in FIG. 3, so that they may slide together along the inclined rails 11 to be fitted onto the frame 10. The motor 51 within each drive box 52 is connected to a circuit board 58, which is in turn connected to a sensor 59 disposed below a drug outlet 56 for counting the number of drugs discharged. The circuit boards 58 may also be interconnected. Such arrangements are well known in the art of automatic control circuits and will not be described in detail herein. In this preferred embodiment, each motor 56 has an axle 57 connected to a stirring element 31 within the drug case 20 (to be described hereinbelow).

Figure 3A:
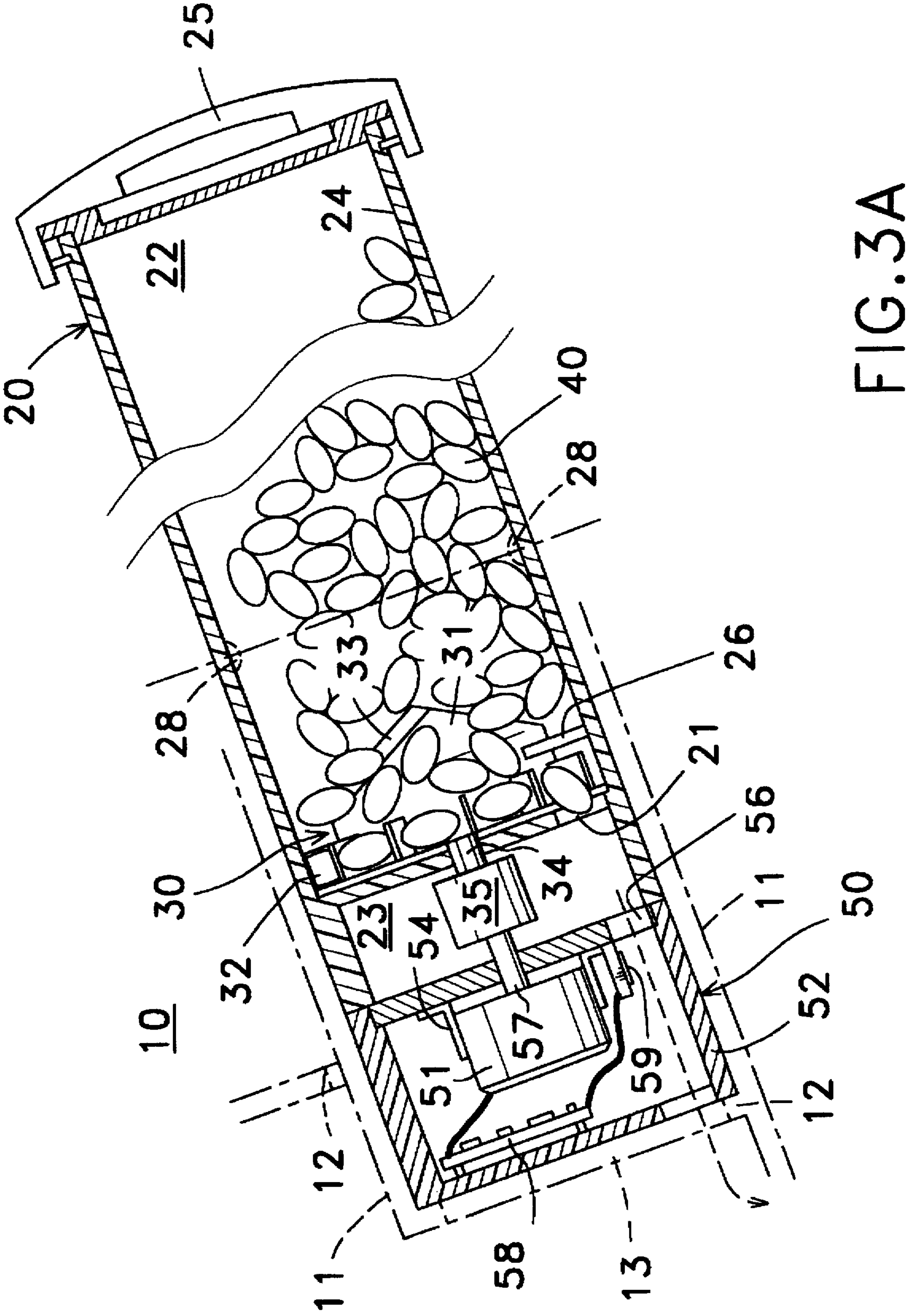
FIG. 3A is similar to FIG. 3, but showing a second preferred embodiment of the present invention.
Figure 4:
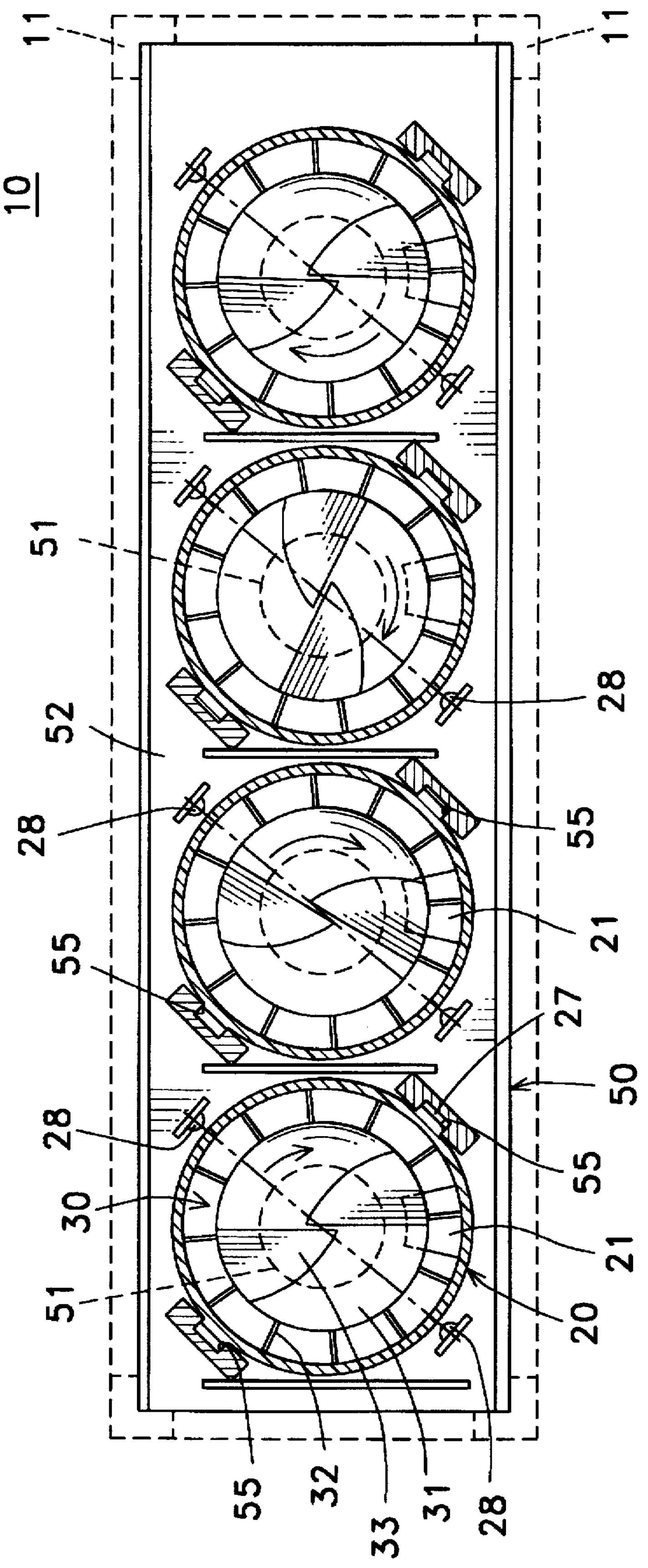
FIG. 4 is a sectional view taken along line 4—4 of FIG. 3A.
Figure 7:
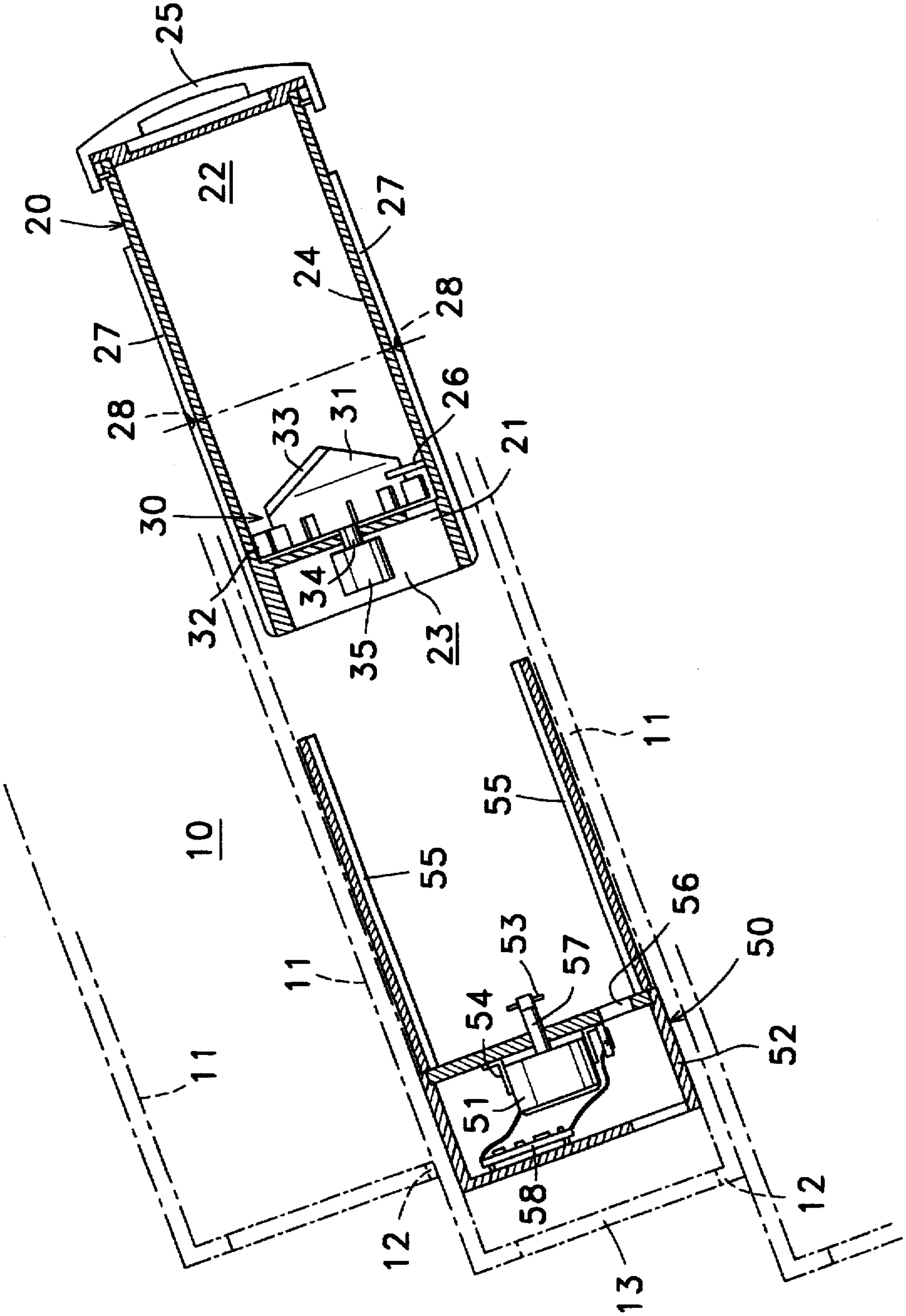
FIG. 7 is similar to FIG. 3, but showing the second preferred embodiment of the invention in an exploded state.

In a second preferred embodiment of the drug storing apparatus of the drug dispensing machine, as shown in FIGS. 3A and 7, the axle 57 of the motor 51 within the drive box 52 of each drive element 50 protrudes from its corresponding drive box 52, which is also provided with a couple of protruding guide rails 55, along which the drug case 20 may slidably engage with or disengage from the drive box 52. The feeding element 30 is also coupled with the axle 57 of the motor 51. By means of supports 54, the motor 51 may be secured within the drive box 52. In this preferred embodiment, each drive box 52 may be provided with more than one motor, for instance, four motors, as shown in FIG. 4, and each motor 51 drives the feeding element 30 within its corresponding drug case 20. Each drug case 20 has two positioning elements 27 for fitting onto the guide rails 55. In this preferred embodiment, the number of inclined rails 11 of the frame 1 is reduced.

The above-mentioned feeding element 30 has a stirring element 31 capable of free rotation disposed at an inner bottom side of the drug case 20. In the preferred embodiments, a top-shaped structure with a groove 33 is adopted as an example of the stirring element 31. The stirring element 31 is provided with a plurality of hollow panels 32 disposed about its outer periphery and spaced apart from each other for containing a fixed amount of drugs, for instance, one panel for one tablet or pill, so that a fixed number of drugs may discharge through an outlet 21 at a bottom end of the drug case 20. Additionally, the stirring element 31 is provided with an axle 34 having a coupling 35 disposed at the bottom thereof for coupling to the axle 57 of the motor 51.

Figure 5:
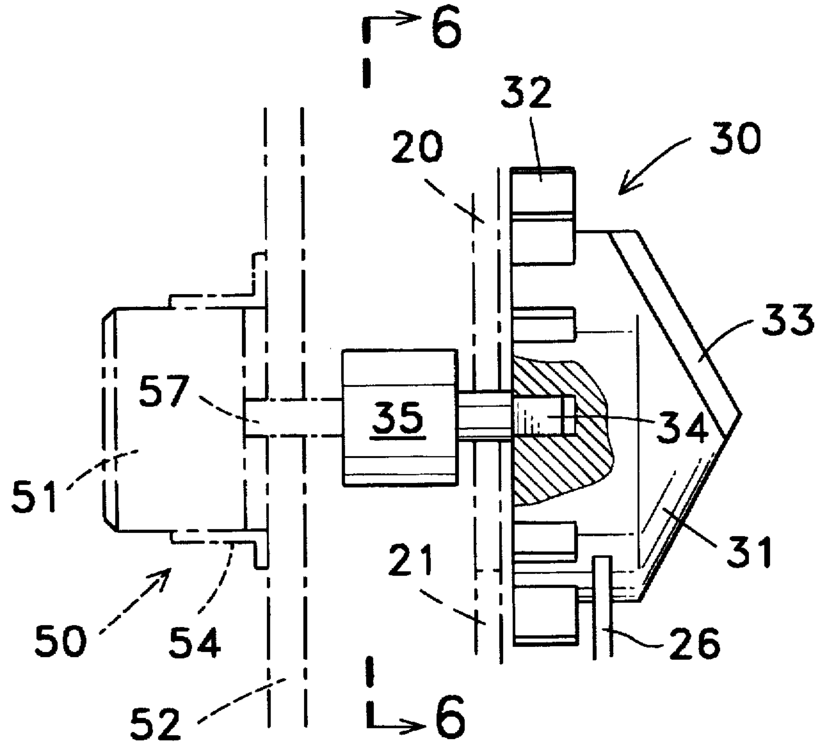
FIG. 5 is a partial front view of a driving element and a feeding element according to the present invention.

To enable the drugs in the drug case 20 to be slowly pushed into the panels 32, the top-shaped stirring element 31 is provided with a propeller structure, such as the groove 33 in FIGS. 3, 4 and 5, or a flange (not shown). A partition 26 is provided near the outlet 21 of the drug case 20 to ensure that the number of tablets or pills entering each panel 32 is fixed, for instance, one tablet or pill for one panel 32.

Since the drug cases 20 are mounted on inclined rails 11, an outer end 22 of each drug case 20 is comparatively higher in position than an inner end 23 thereof. Both the above-mentioned outlet 21 of the drug case 20 and the feeding element 30 are disposed at the inner end 23. Such an arrangement enables the bottom surface of the drug case 20 to form an inclined plate 24, so that drugs poured in via a lid 25 of the outer end 22 may roll towards the feeding element 30 near the inner end 23 by means of their own weights. Obviously, as shown in FIGS. 3, 3A and 4, one or two sensors 28 connected to the circuit board 58 (not shown) may be provided at middle portions of each drug case 20 for measuring the amount of drugs stored therein. The sensor(s) 28 may generate a signal when the amount of drugs stored in the drug case 20 falls below a pre-determined level. In order that the amount of drugs stored may be checked easily, the drug cases 20 are preferably made of transparent or translucent materials, and photo-sensitive sensors are adopted.

Figure 6:
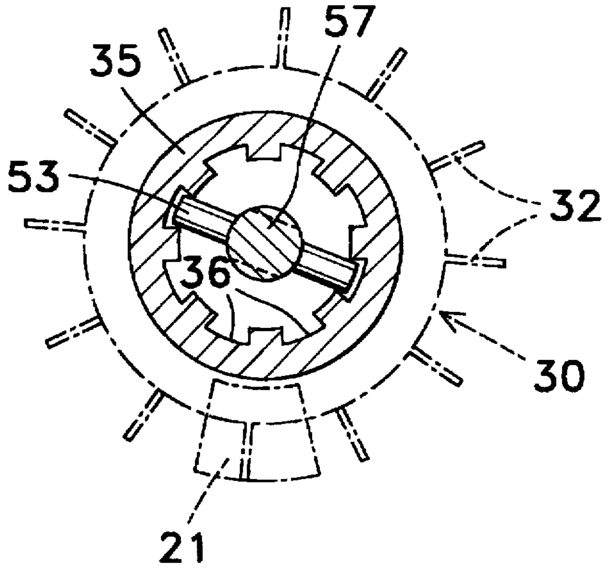
FIG. 6 is an enlarged sectional view taken along line 6—6 of FIG. 5.

With reference to FIG. 5, the axle 34 at the bottom of the stirring element 31 projects from the case drug 20 to couple with the coupling 35, the bottom edge thereof is provided with a plurality of grooves 36, as shown in FIG. 6. Relatively, an end portion of the axle 57 of the motor 51 is provided with at least one pin 53 perpendicular to the axle 57. When the drug case 20 slides along the guide rails 55 to fit onto the drive box 52, as shown in FIG. 3A, the pins 53 fit into a plurality of grooves 36, and the axle 57 of the motor 51 may drive the stirring element 31 of the feeding element 30 to rotate within a specific angle, so that the tablets or pills in the panels 32 are driven to the outlet 21.

No matter whether the drug cases 20 are configured to be coupled with the drive boxes 52 as in the second preferred embodiment shown in FIG. 3A or separated therefrom as in the first preferred embodiment shown in FIG. 3, when the drug cases 20 are being refilled or when damaged motors 51 or feeding elements 30 need repairs, the concerned drug cases 20 may be removed along the inclined rails 11 of the frame 10, without the need to stop the operation of the entire drug storing apparatus. Furthermore, when the drive box 52 is slipped onto the inclined rails 11, it may be checked and positioned by a baffle element 12. When tablets 40 are discharged via the outlet 21 at the bottom of the drug case 20 through the drug outlet 56 at the upper edge of the drive box 52 and a hole 13 in the frame 10, they will drop into the hopper 2 in the central portion of the frame 10 and further into the packing machine.

The above-mentioned drug cases 20, drive boxes 52 and feeding elements 30 may be standardized and mass produced in a speedy manner. The inclined rails 11 on the frame 10 may also be standardized to facilitate production and assembly. During assembly, the drug cases 20 and drive boxes 52 may be fitted onto the inclined rails 11 one by one, and electrical connectors may be used to connect the circuit boards 58 of the drive boxes 52 to a central processing unit. The drug storing apparatus according to the present invention is therefore not only quick to manufacture and assemble, but it is also convenient and easy to repair.

Figure 8:
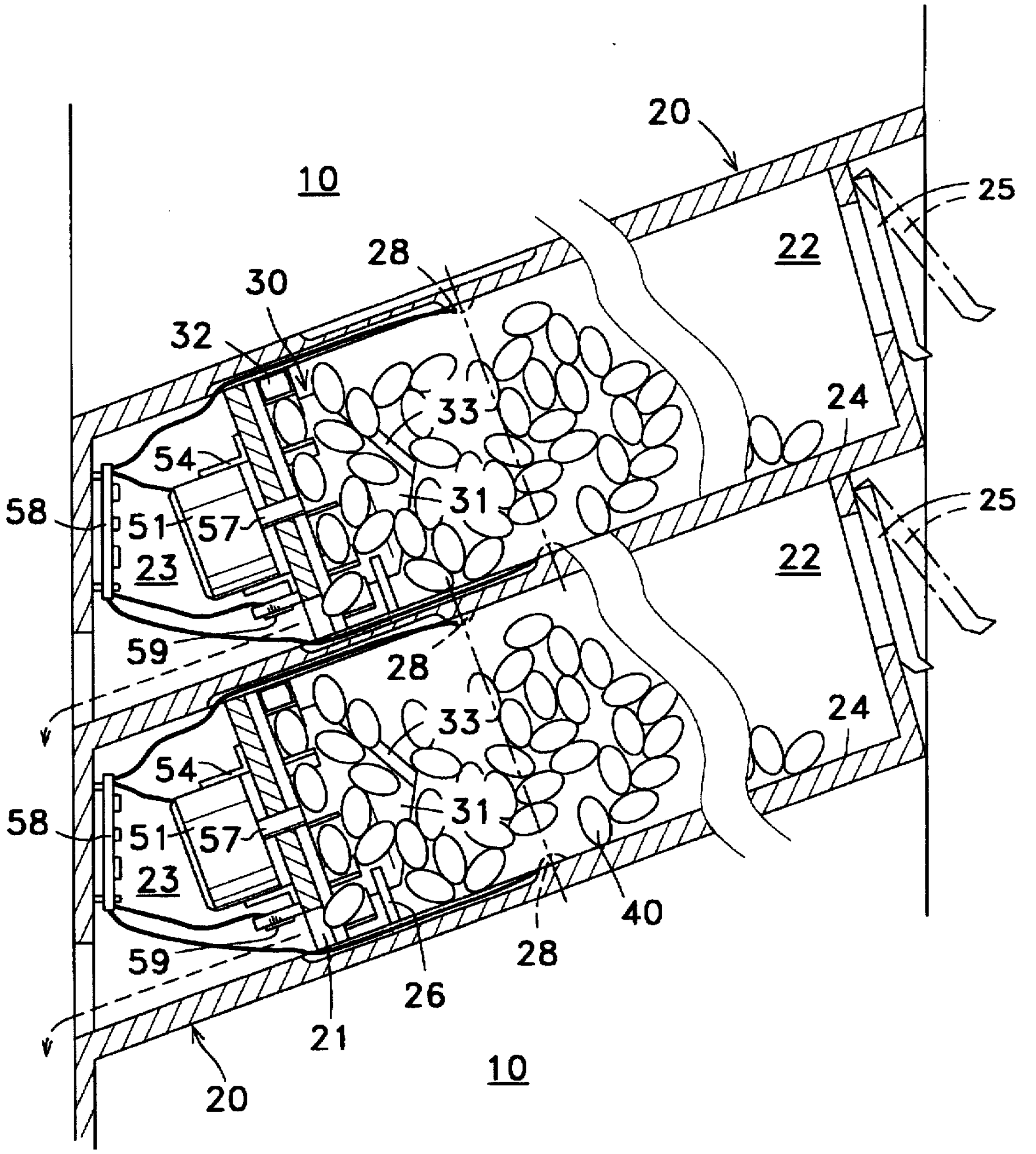
FIG. 8 is similar to FIG. 3, but showing a third preferred embodiment of the present invention.
Figure 9:
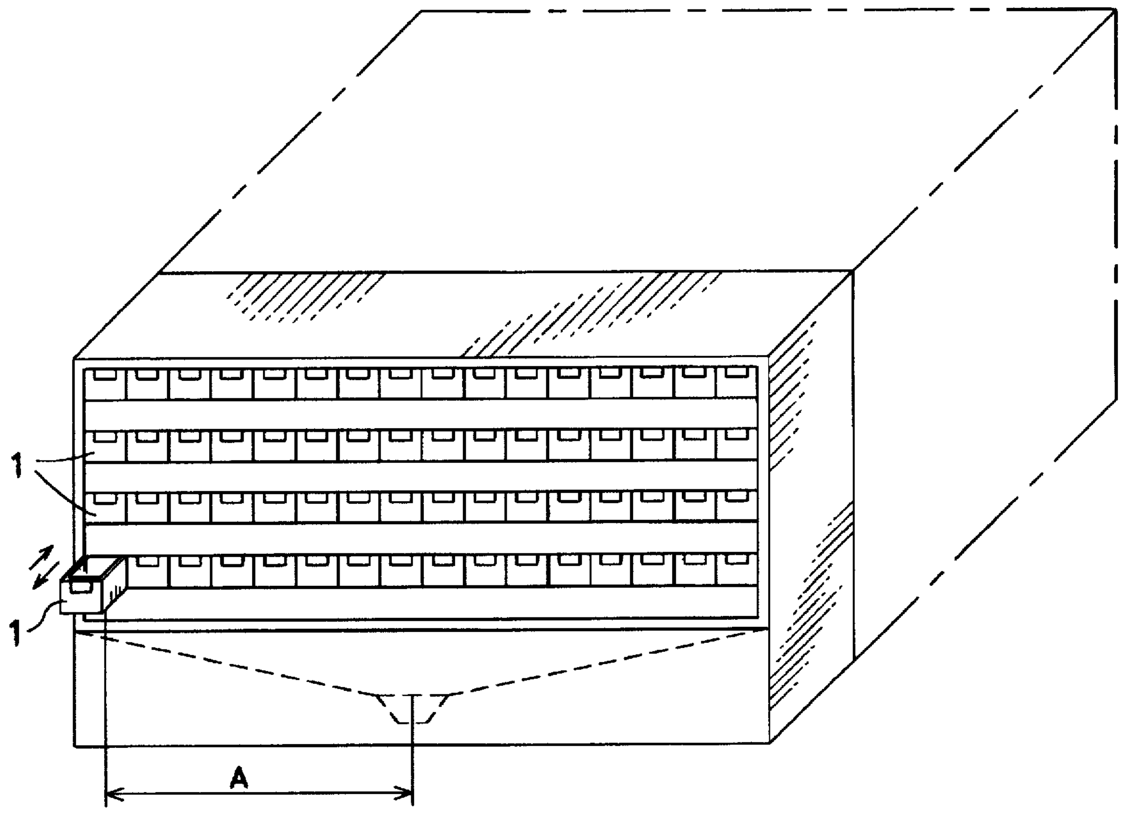
PRIOR ART FIG.9
FIG. 9 is a perspective view of the prior art.

A third preferred embodiment of the drug storing apparatus of the present invention is shown in FIG. 8. The frame is provided with a multiplicity of inclined supports arranged in rows which are placed one top of the other. An upper support and a lower support together constitute a drug case 20, with the lower support forming the inclined plate 24. In actuality, both the upper and the lower supports are inclinedly disposed. Each drug case 20 formed by the above arrangement has an outer end 22 and an inner end 23. The outer end 22 must be higher than the inner end 23 in position, and the bottom edge of the outer end 22 and that of the inner end 23 must be connected so as to form the above-mentioned inclined plate 24. By this arrangement, when the tablets or pills inside a drug case 20 roll towards the inner end 23 along the inclined plate 24, there is no need to provide any mechanism to push the tablets or pills towards the outlet 21 below the feeding element 30. The other components of this preferred embodiment of the drug storing apparatus are substantially the same as those in the previous two embodiments, with the exception that the lid 25 takes a different shape herein. Furthermore, the pair of sensors 28 shown in FIG. 8 is fixedly provided on the inside of the drug case 20. Since the drug case 20 in this preferred embodiment cannot be detached from the frame 10, an axle 57 of a motor 51 is directly fitted to the bottom of a stirring element 31, without the need to provide a coupling.

In the present invention, all the motors 51, sensors 28 for detecting the amount of drugs in the drug cases 20, and sensors 59 disposed at the outlets 21 are connected to a computer control center (not shown) in a direct manner or via their corresponding circuit boards 58. When the motor 51 receives a command from the computer control center to drive the panels 32 to turn through a specific angle, i.e., to advance one panel and then pause, the tablet or pill 40 within one of the panels 32 will align with the outlet 21. The tablet or pill 40 is then discharged through the outlet 21 into the hopper 2. The sensor 59 near the outlet 21 will detect and count the number of tablets or pills 40 when they pass through the outlet 21 and will feed back the sensed data to the computer control center for comparison and control.

Although the present invention has been illustrated and described with reference to the preferred embodiments thereof, it should be understood that it is in no way limited to the details of such embodiments, but is capable of numerous modifications within the scope of the appended claims.

What is claimed is:

1. A drug storing apparatus for use in an automatic drug dispensing machine, comprising a frame for supporting a multiplicity of drug cases, each of said drug cases having an outlet and a feeding element disposed near said outlet for automatically feeding a fixed number of drugs, so that tablets or pills stored in each of said drug cases may, according to a command from a computer control center, be individually discharged via said outlet into a hopper located below a lower portion of said frame to be ready for packing, wherein said frame has a multiplicity of inclined rails oriented towards a same direction;

each of said drug cases has an inner end and an outer end, said outer end being disposed at a position higher than that of said inner end with an inclined plate connecting one bottom edge of said outer end and a bottom edge of said inner end, said inner end being provided with said outlet and said feeding element; and a multiplicity of drive elements each having a drive box slidable along said inclined rails for fitting onto said frame are provided for feeding a fixed number of drugs, said drive box accommodating therein at least a motor and connecting to at least one of said drug cases for detachably fitting onto said inclined rails of said frame as a whole.

2. A drug storing apparatus as claimed in claim 1, wherein said frame is a cylindrical or polygonal structure and said hopper is disposed in a central portion of said frame, said drug cases being mounted on said frame with their inner ends distributed around said hopper.

3. A drug storing apparatus as claimed in claim 1, wherein said motor contained in said drive box has an axle projecting from said drive box, and said drive box has a plurality of projecting guide rails along which each of said drug cases may slidably detach from or engage with said drive box so that said feeding element may detach from or couple with said axle of said motor.

4. A drug storing apparatus as claimed in claim 1, wherein at least a sensor is disposed at a middle portion of each of said drug cases for detecting the amount of drugs stored therein.

5. A drug storing apparatus as claimed in claim 4, wherein said drug cases are transparent or translucent.

6. A drug storing apparatus as claimed in claim 1, wherein said feeding element has a stirring element capable of free rotation disposed at an inner bottom side of each of said drug cases, said stirring element having a plurality of panels spaced apart from each other and disposed about an outer periphery thereof for separating and containing a fixed number of tablets or pills for discharge via said outlet at said inner end of each of said drug cases, said stirring element further having a rotary axle with a coupling at a bottom side thereof for coupling to said axle of said motor disposed inside said drive box.

7. A drug storing apparatus as claimed in claim 6, wherein said coupling has a bottom edge provided with a plurality of grooves, and said axle of said motor is provided with at least one pin disposed perpendicularly to said axle of said motor for fitting into said grooves of said coupling for retaining and driving said stirring element.

8. A drug storing apparatus as claimed in claim 6, wherein said stirring element is a top-like structure.

* * * * *